(12) United States Patent
Torres Martinez

(10) Patent No.: US 9,109,312 B2
(45) Date of Patent: Aug. 18, 2015

(54) APPLICATION HEAD FOR APPLYING FIBER STRIPS

(76) Inventor: Manuel Torres Martinez, Pamplona (ES)

( * ) Notice: Subject to any disclaimer, the term of this patent is extended or adjusted under 35 U.S.C. 154(b) by 268 days.

(21) Appl. No.: 13/809,781

(22) PCT Filed: Jun. 2, 2011

(86) PCT No.: PCT/ES2011/000182
§ 371 (c)(1),
(2), (4) Date: Jan. 11, 2013

(87) PCT Pub. No.: WO2012/007603
PCT Pub. Date: Jan. 19, 2012

(65) Prior Publication Data
US 2013/0111725 A1  May 9, 2013

(30) Foreign Application Priority Data

Jul. 14, 2010  (ES) .................................. 201000906

(51) Int. Cl.
*B29C 70/38* (2006.01)
*D04H 13/00* (2006.01)

(52) U.S. Cl.
CPC .............. *D04H 13/00* (2013.01); *B29C 70/388* (2013.01); *Y10T 29/49801* (2015.01)

(58) Field of Classification Search
CPC ........................... B29C 70/384; B29C 70/382
USPC .................. 156/433, 441, 573, 523
See application file for complete search history.

(56) References Cited

U.S. PATENT DOCUMENTS

| | | | |
|---|---|---|---|
| 4,696,707 A | 9/1987 | Lewis | |
| 4,750,965 A * | 6/1988 | Pippel et al. | 156/361 |
| 6,491,773 B1 * | 12/2002 | Miller et al. | 156/64 |
| 7,922,856 B2 * | 4/2011 | Hagman et al. | 156/247 |
| 8,042,594 B2 * | 10/2011 | Miller et al. | 156/582 |
| 8,394,223 B2 * | 3/2013 | Genssen | 156/242 |
| 2009/0140451 A1 | 6/2009 | Wampler et al. | |
| 2011/0259511 A1 * | 10/2011 | Borsting et al. | 156/243 |
| 2013/0092325 A1 * | 4/2013 | Genssen | 156/580 |

FOREIGN PATENT DOCUMENTS

| | | |
|---|---|---|
| EP | 0333010 A1 | 9/1989 |
| ES | 9302506 A1 | 3/1998 |
| ES | 9402102 A1 | 5/1998 |
| ES | 200200524 A1 | 8/2004 |
| ES | 200401853 A1 | 2/2006 |
| WO | 2010055063 A1 | 5/2010 |

* cited by examiner

*Primary Examiner* — Jeff Aftergut
(74) *Attorney, Agent, or Firm* — Lucas & Mercanti, LLP

(57) ABSTRACT

The present invention relates to an application head for applying fiber strips made up of a structural assembly determining a path conveying multiple fiber strips (2) to an application area (3), each fiber strip (2) passing through a drive roller (5) and a tension regulator (6), whereas in the application area (3) the fiber strips (2) are pressed individually by a compactor system (8) comprising a series of independent partial rollers (9), each of which is arranged with a fastening comprising a system for height wise movement and a floating system.

6 Claims, 10 Drawing Sheets

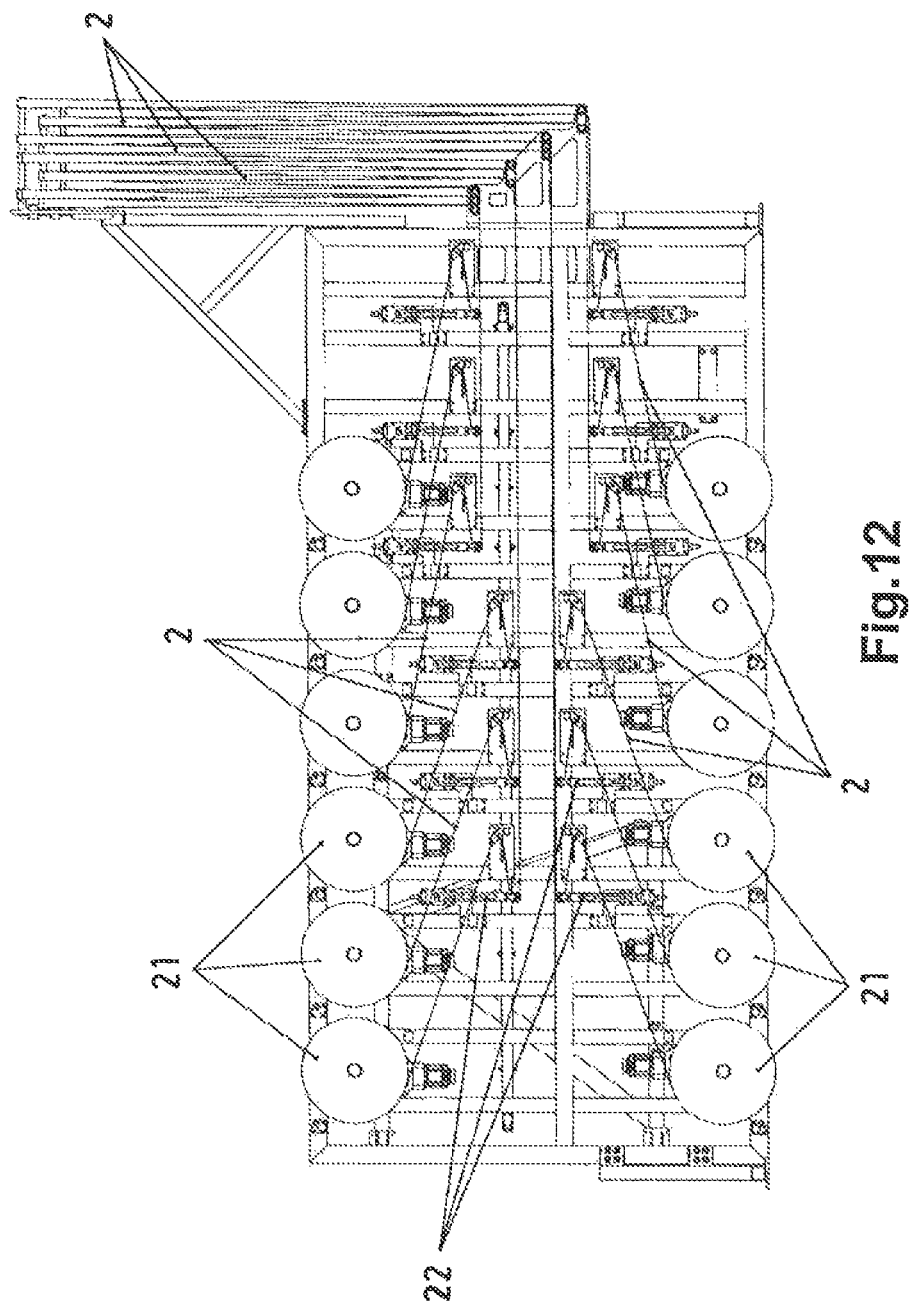

APPLICATION HEAD FOR APPLYING FIBER STRIPS

CROSS-REFERENCE TO RELATED APPLICATIONS

This application is a 371 of PCT/ES2011/00182 filed Jun. 2, 2011, which in turn claims the priority of ES P201000906 filed Jul. 14, 2010, the priority of both applications is hereby claimed and both applications are incorporated by reference herein.

FIELD OF THE ART

The present invention relates to part, formation by means of applying carbon fiber strips, fiber glass strips or strips made from other similar fibers, proposing an application head for applying fiber strips in said junction with features that optimize work functionality and application surface adaptation.

STATE OF THE ART

Current demand for large parts made of fiber glass, carbon fiber or other similar fibers for sectors such as the wind energy sector or the aeronautical sector requires the development of machinery that allows automating the processes for manufacturing said parts to increase quality and productivity levels.

In that sense, application heads for applying fiber strips like those described in Ingersol Milling Machine Company's patent U.S. Pat. No. 4,696,707, Cincinati Milacon Inc's patent EP 0 333 010 and patents ES 9302506 and ES 9402102 belonging to the same applicant as the present invention, have been developed.

Said heads apply a fiber strip or band, repeating the application successively in a lateral progression until covering the entire surface to be formed, for which the strips or bands which are applied can be wide in order to cover the entire application surface with a minimum number of passes, having the drawback that an excessive material wastage occurs during trimming to form the edges of the parts; or narrow strips can be used whereby there is less material wastage, but in contrast a greater number of passes is required whereby it increases the working time and reduces yield.

To solve the problem application heads for applying multiple fiber strips such as those of patents ES 200200524 and ES 200401853 belonging to the same applicant as the present invention have been developed, such that a series of narrow fiber strips is applied with each pass, the strips together determining a broad application area, the supply of each of the strips being independent from the others.

On the other hand, the use of elastic rollers in the application heeds for applying fiber strips that are capable of absorbing small application surface deformations is known; and segmented application rollers which allow exerting greater compaction pressures on the fiber strips applied are also known.

Said systems are very efficient for flat surfaces or slightly curved surfaces as well as on surfaces with a pronounced convex curve, because even though the working roller does not contact the application surface entirely, the central part thereof does contact the surface, being able to work with only a fraction of the band width. However, on the surfaces with a pronounced concavity compacting with said rollers is not possible because sufficient deformation thereof is impossible.

OBJECT OF THE INVENTION

The invention proposes an application head for applying multiple fiber strips whereby sections of application surface with significant differences in height can be compacted simultaneously without adversely affecting the compacting process, allowing the application of fiber strips both on flat surfaces and on convex or concave curved surfaces with a wide range of curvatures.

This head object of the invention comprises an assembly arranged for height wise movement, through which a series of fiber strips pass to an application area, wherein there is arranged a compactor system made up of multiple, short, independent partial rollers arranged consecutively in an axial succession, each of the rollers being supported by means of a fastening comprising a system for height wise movement operated by a motor and a floating compensation system made up of a pneumatic cylinder.

A head whereby the fiber strips are pressed individually in the application area by the partial rollers of the compactor system is thus obtained, such that the assembly can be moved closer to the application surface by means of moving the entire head vertically and the rollers are positioned individually on the area in which each of them has to perform the application by means of the system for height wise movement of the support of each roller, for exerting compaction pressure of the corresponding fiber strip in said area, whereas during the application each of the rollers can absorb the irregularities of the application surface by means of the floating compensation system without adversely affecting the compaction.

The partial rollers of the compactor system are made of an elastomer material with longitudinal holes therein, whereby said rollers are more elastic, favoring therewith the uniformity of the application of the fiber strips which they press on.

Furthermore, said partial rollers of the compactor system are arranged in a staggered longitudinal distribution in two parallel rows, which allows applying very narrow fiber strips such that they are laterally tangent with one another in the application.

On the other hand, in the path of the fiber strips through the head to the application area, there is arranged in relation to the passage of each of the fiber strips a drive roller combined with a tension regulator, the tension regulator comprising a roller for the passage of the corresponding fiber strip associated with a linear displacer provided with a position sensor.

Any variation in the tension of the fiber strip is thus perceived by the tension regulator which produces a signal varying the speed of the drive roller to recover the tension of the fiber strip and return it to the established value, perfect uniformity in supplying the fiber strips passing through the head to be applied, as well as a reserve storage for regulating the feeding without jerking or applying excessive tension on the strips thus being achieved, allowing supplying the fiber strips from large reels which can be calculated for the necessary amount of the fiber strips in each application or which minimize the necessary changing of reels in any case.

In view of the foregoing, the head of the invention has very advantageous features for applying fiber strips for which it is intended, acquiring its own identity and preferred character with respect to the known heads which have been used for the same function.

DESCRIPTION OF THE DRAWINGS

FIG. 12 is a side view of the machine of the preceding figure from the side on which the reels supplying the fiber strips are located.

DETAILED DESCRIPTION OF THE INVENTION

Figure 1:
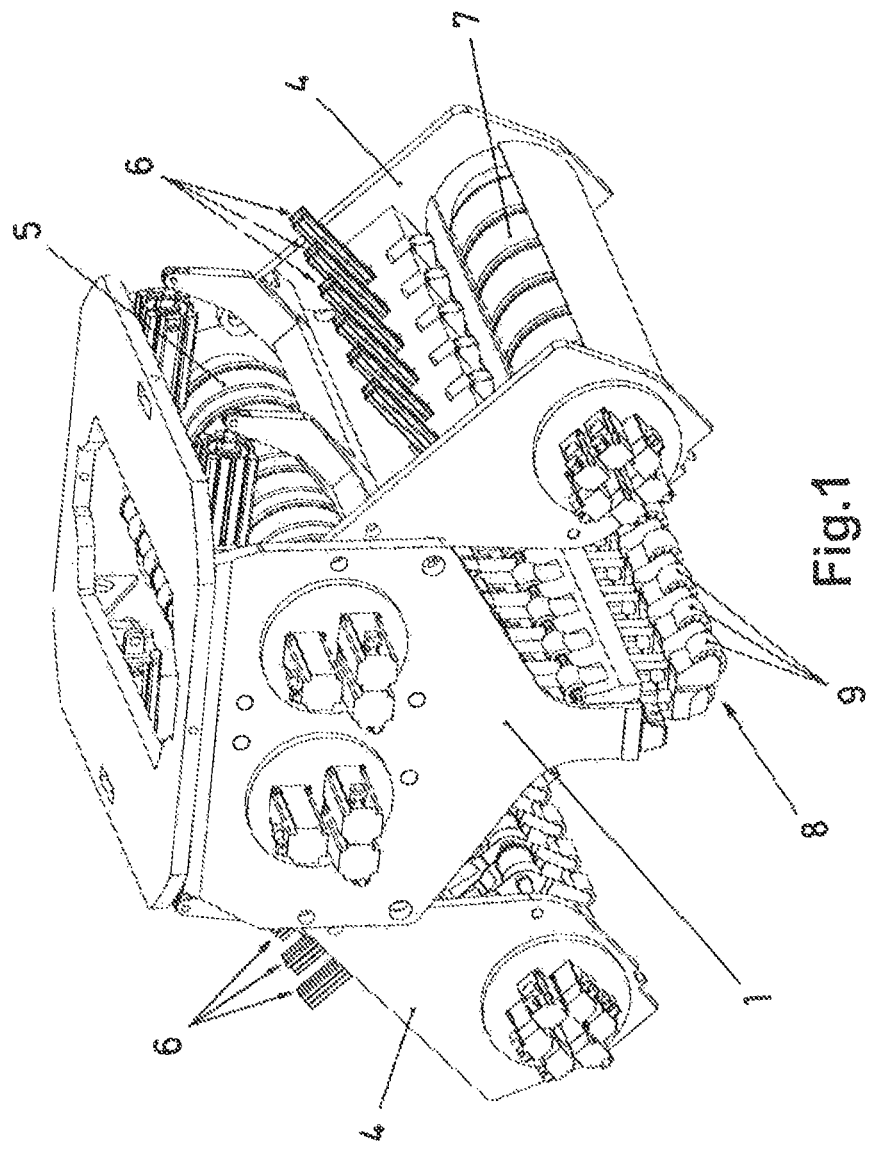
FIG. 1 shows a perspective view of the head object of the invention in an open position for threading the fiber strips intended for being applied with same.

The object of the invention relates to a head intended for applying glass fiber strips, carbon fiber strips or strips made from other similar fibers for forming composite material parts by means of lining superimposed layers with fiber strips, particularly of the type simultaneously applying multiple narrow fiber strips determining a broad application area with each pass of the head.

The proposed head comprises a structural assembly intended for an assembly installation having the capacity for height wise movement, comprising a central block (1) through which the passage of multiple fiber strips (2) from the upper part to an application area (3) is established, sides blocks (4) which can be swiveled outwards for threading the fiber strips (2) in the path for the passage of same through the head being coupled to said central block (1).

The path of each of the fiber strips (2) through the head comprises the passage through a drive roller (5) and through a tension regulator (6), as well as the passage through a rotational cutting system (7) to end in the application area (3), wherein a compactor system (8) presses each fiber strip (2) individually on the application surface.

Figure 2:
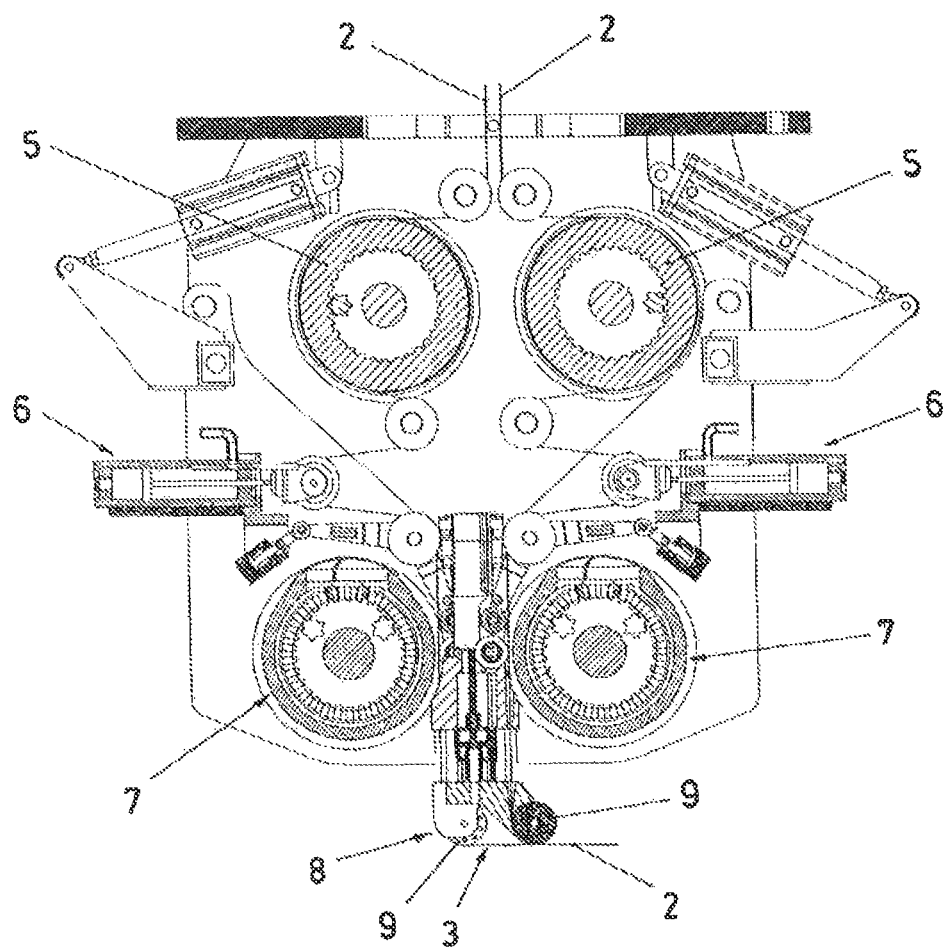
FIG. 2 is a front sectional view of the head, the path of the fiber strips through same being observed.

The compactor system (8) comprises a series of partial rollers (9) located independently in axial correspondence, a fiber strip (2) to be pressed individually on the application surface passes through each of the rollers. To enable applying very narrow fiber strips (2) which are laterally tangent to one in the application, said partial rollers (9) of the compactor system (8) are arranged in a staggered manner in two parallel rows, the fiber strips (2) being supplied to those two rows of partial rollers (9) by two different path areas through the head, as observed in FIG. 2.

Figure 3:
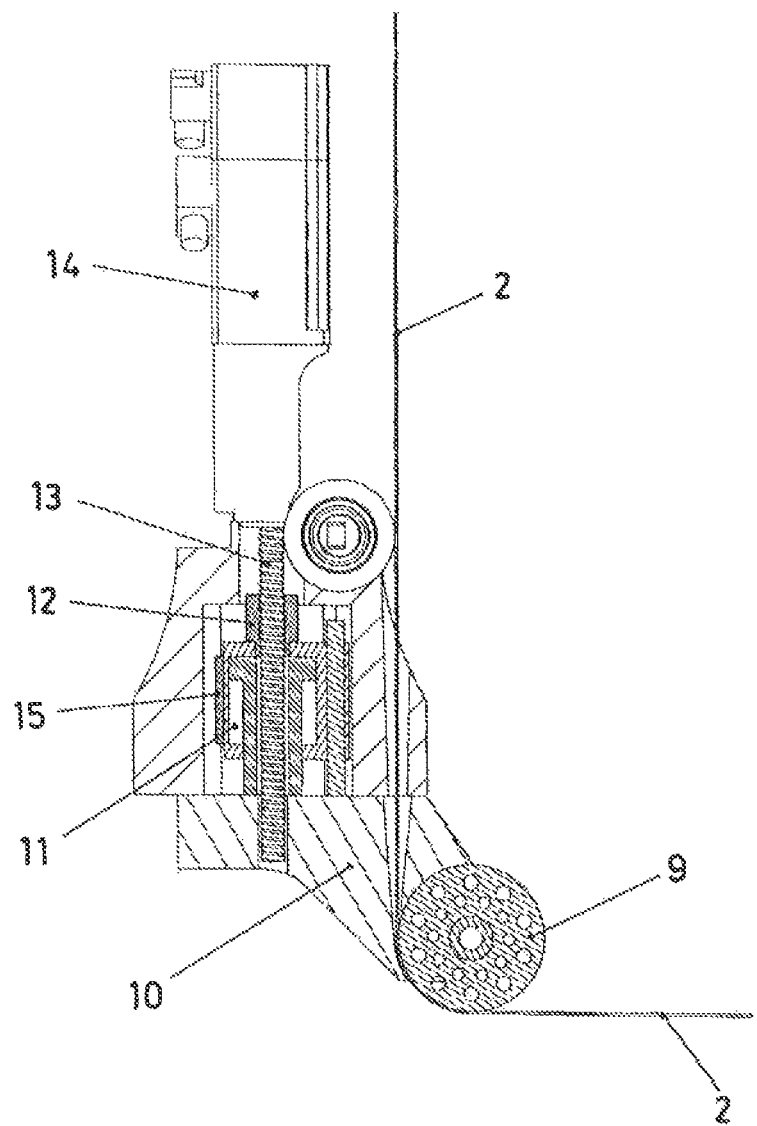
FIG. 3 is a sectional view of an enlarged detail of the arrangement of the assembly of a partial roller of the front row of the compactor system, with the system for height wise movement of said roller in the position of maximum elevation.
Figure 4:
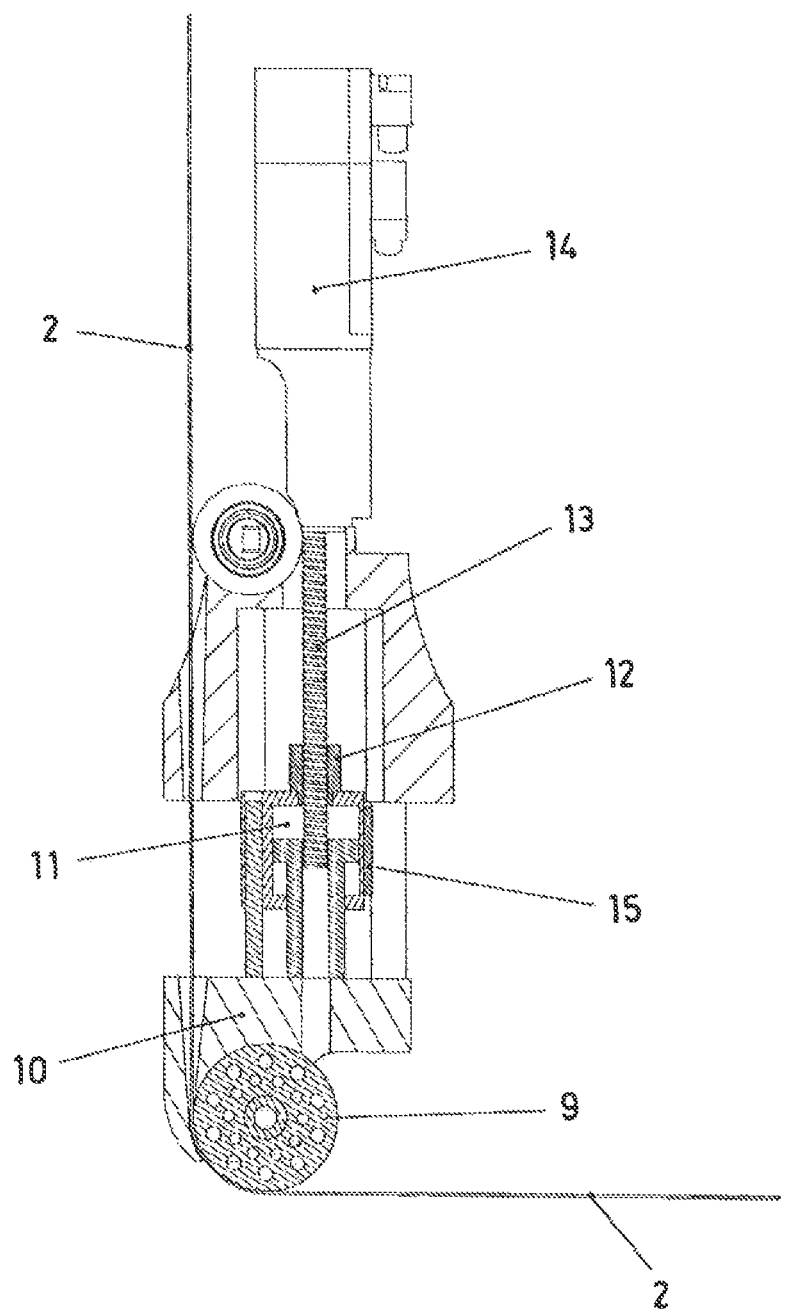
FIG. 4 is a sectional view of an enlarged detail of the arrangement of the assembly of a partial roller of the back row of the compactor system, with the system for height wise movement of said roller deployed downwards.

In the assembly arrangement in the head, each partial roller (9) of the compactor system (8) is incorporated in a support (10) which can move in height and which is attached to a pneumatic cylinder (11) which is in turn coupled by means of a nut (12) with respect to a vertical spindle (13) which is operated by a rotating motor (14), as observed in FIGS. 3 and 4.

The nut (12), spindle (13), and rotating motor (14) are part of a system for individual height-wise movement of each of the partial rollers (9). The pneumatic cylinder (11) is part of a floating compensation system and is connected to a pneumatic system, which is regulated by an automatic control for keeping the piston of said pneumatic cylinder (11) in the mid position of the longitudinal path, having a position sensor (15) which detects the deviations of the piston with respect to said mid position and activates the pneumatic system to recover said mid position.

Figure 5:
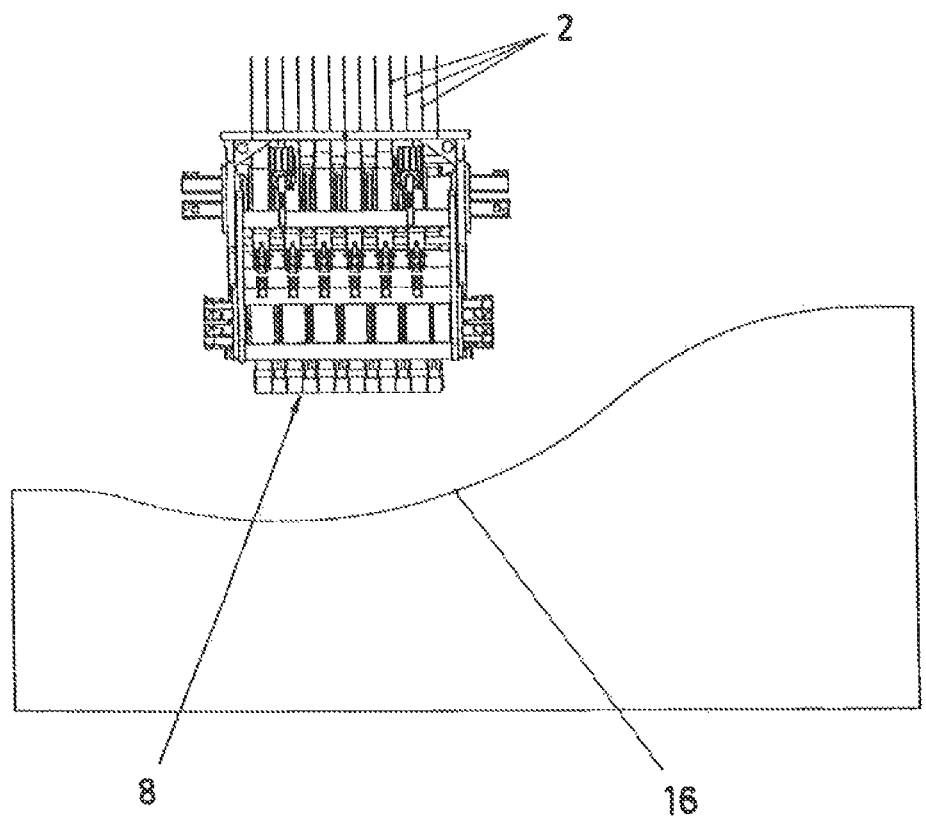
FIG. 5 is a depiction of the head in the initial preparation position, separated with respect to the application surface of the fiber strips.
Figure 6:
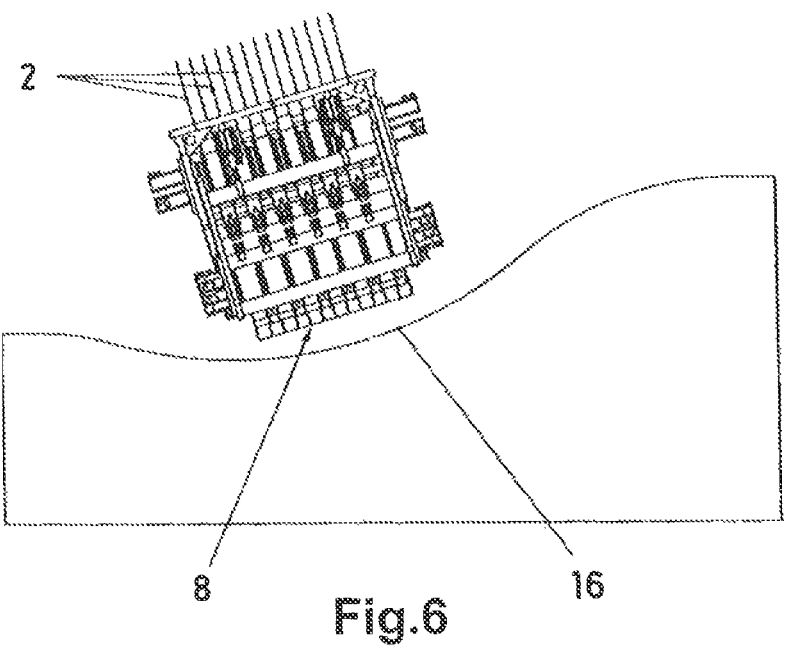
FIG. 6 is a depiction of the head in the position of moving closer to the application surface of the fiber strips.
Figure 7:
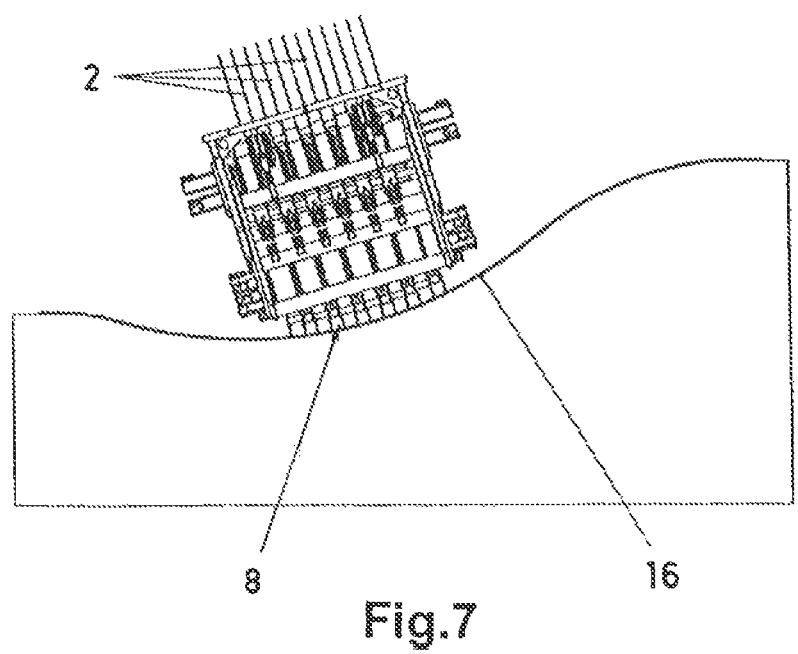
FIG. 7 is a depiction of the head in the position of adapting the compaction system to the application surface of the fiber strips.
Figure 8:
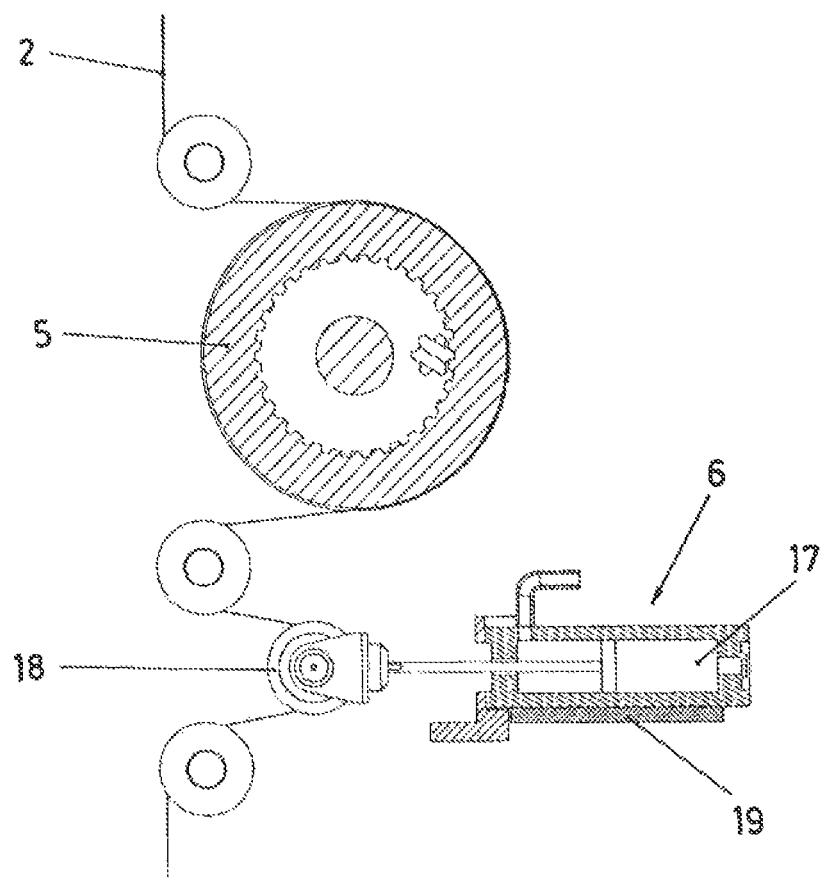
FIG. 8 is a view of a detail of the fiber strip tension control system with the linear displacer of the tension regulator in the mid position.
Figure 9:
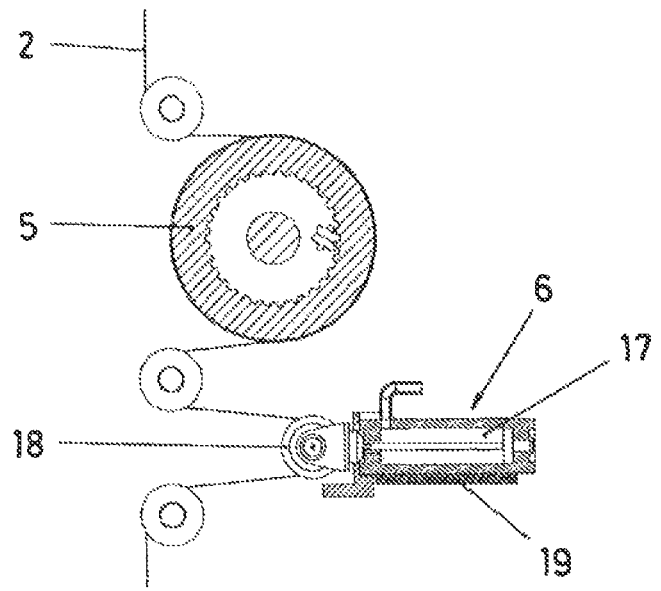
FIG. 9 is a view of the same preceding detail with the linear displacer in an end position.
Figure 10:
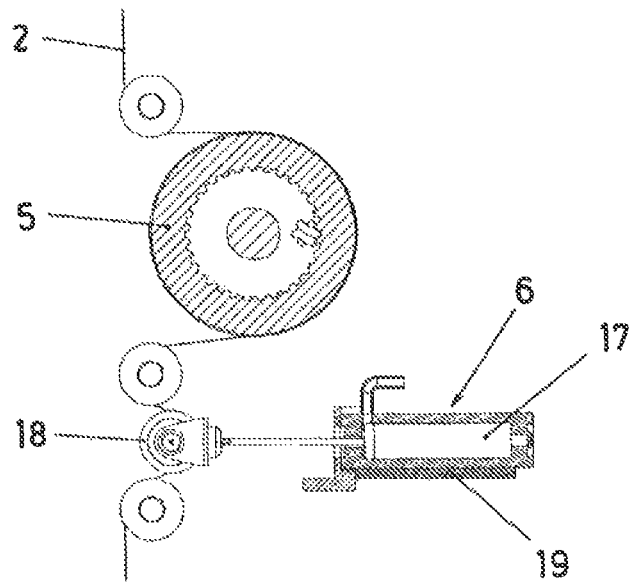
FIG. 10 is a view of the same preceding detail with the linear displacer in the opposite end position.

Therefore, the partial rollers (9) of the compactor system (8) have three vertical movements for applying the fiber strips (2) on the application surface such that starting from a preparation position with the head separated with respect to a work surface (16), as observed in FIG. 5, the head assembly is moved closer to the work surface (16) by means of moving same such that the compactor system (8) is positioned facing said work surface (16) in a manner corresponding with the surface, as observed in FIG. 6, and then by means of the individual vertical movement of each of the partial rollers (9) the compactor system (8) is adapted on the work surface (16) according to the configuration of the surface, as observed in FIG. 7.

The head can therefore be used with complete effectiveness for applying fiber strips (2), even on work surfaces (16) having a pronounced concave shape, since the individual and independent positioning of each of the partial rollers (9) allows adapting the assembly of the compactor system (8) to flat or curved shapes of any type in an extremely variable manner.

In the application of the fiber strips (2), the pneumatic cylinder (11) of the support of each partial roller (9) further performs a function of a compensating cushion, allowing absorbing the probable irregularities of the work surface (16), for overcoming said irregularities without producing abrupt incidents which may alter the uniformity of applying the fiber strips (2).

The partial rollers (9) are provided with elastomer material and with longitudinal holes therein, as observed in FIGS. 3 and 4, whereby said partial rollers (9) are very elastic, thereby also favoring uniformity of applying the fiber strips (2) on the work surface (16) on which the application is performed.

The tension regulator (6) comprises a linear displacer (17) which can be of any type, in which there is incorporated a roller (18) through which the corresponding fiber strip (2) passes, the linear displacer (17) having a position sensor (19) detecting the movements of said linear displacer (17) in one direction or another with respect to a mid position.

Therefore, by taring the tension regulator (6) for a specific tension of the fiber strips (2) such that said tension corresponds with the mid position of the linear displacer (17), when the corresponding fiber strip (2) undergoes a tension alteration when it is supplied to the application process, said alteration is detected by the tension regulator (6) which generates a signal varying the rotating speed of the respective drive roller (5) to increase or reduce the speed of supplying the fiber strip (2) in order to recover she tension of the fiber strip and return it to the established value.

A regulation which allows supplying the fiber strips (2) to the application process in a completely uniform manner is thus obtained, preventing jerking and excessive tension that are hazardous for obtaining a suitable compaction on the work surface (16), the linear displacer (17) determining a storage which allows absorbing the punctual variations in the supply of the fiber strip (2) during the regulations of the compactor system (8), the cutting of the fiber strip (2), etc.

Figure 11:
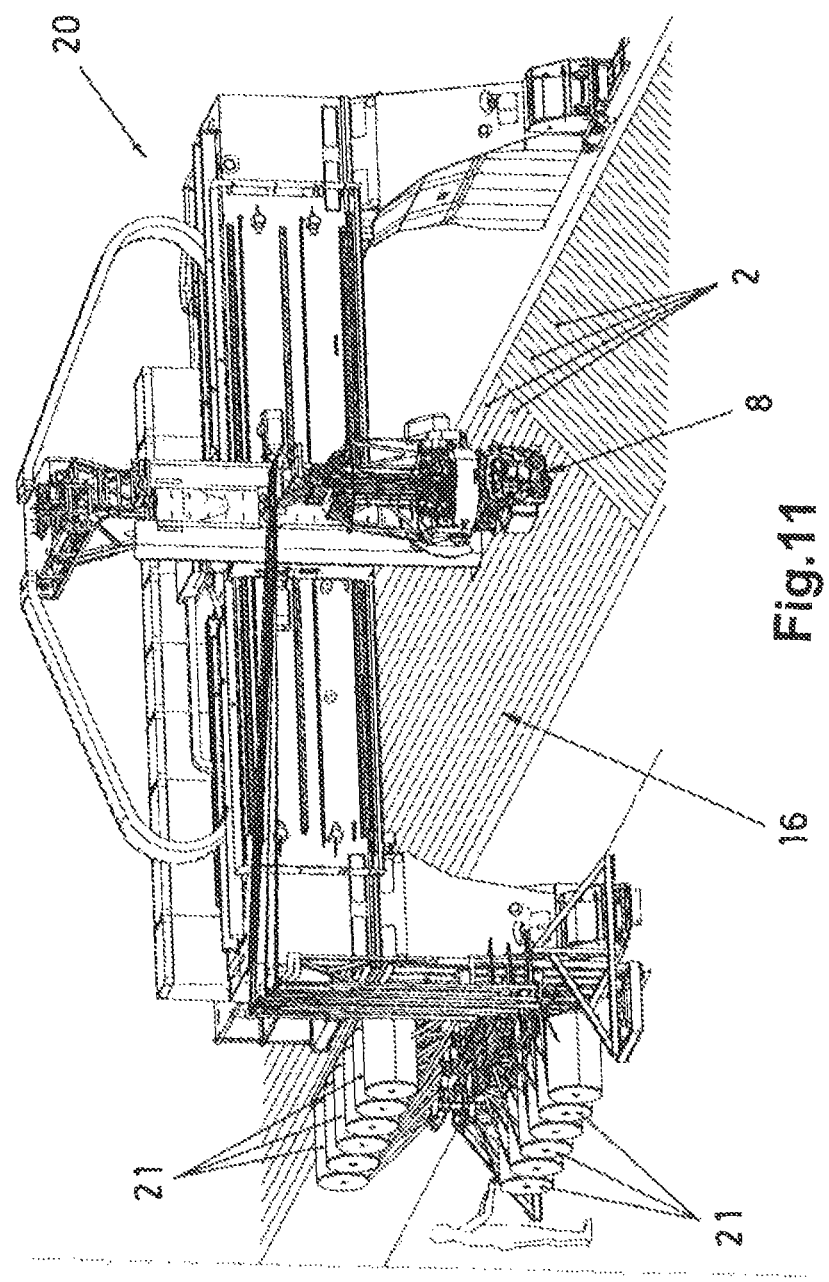
FIG. 11 shows a perspective view of a machine for applying fiber strips provided with the head of the invention.

The proposed head can therefore be used in a machine (20) for applying fiber strips (2) on work surfaces (16) of any type as depicted in FIG. 11, the fiber strips (2) to be applied being supplied from an assembly of feed reels (21), as observed in FIG. 12, the fiber strips (2) passing to the outlet of the corresponding reels (21) through respective tension-regulating tappets (22).

High volume reels (21) can thus be used without affecting the feed of the fiber strips (2) to achieve a uniform application of the strips, the reels (2) with the necessary content of fiber strips (2) being able to be calculated for the entire process of forming the parts to be manufactured in each case, such that there is no need to change the reels (21) during said process of forming the parts to be manufactured, and when this is not possible due to the necessary volume of material, the number of necessary changes of the feed reels (21) is minimum.

The invention claimed is:

1. An application head for applying fiber strips comprising:
a structural assembly intended for being incorporated for height wise movement, determining a path for the passage of multiple fiber strips from the upper part to a lower application area; and
a compactor system individually pressing the fiber strips against the application surface;
wherein, in the path towards the application area, the fiber strips pass independently through a drive roller and through a tension regulator controlling the rotating speed of the drive roller,
the compactor system having a series of independent partial rollers which press the fiber strips individually on the application surface, each of said partial rollers being arranged with a system for individual height wise movement of the each of said partial rollers and a floating compensation system.

2. The application head for applying fiber strips according to claim 1, wherein the system for height wise movement of each partial roller of the compactor system comprises a vertical spindle which is operated by a motor and which passes through a nut attached to the securing assembly for securing the partial roller.

3. The application head for applying fiber strips according to claim 1, wherein the floating system of each partial roller of the compactor system comprises a pneumatic cylinder which is connected to a pneumatic system regulated by an automatic control for keeping the piston of said pneumatic cylinder in a mid position of the longitudinal path, having a position sensor activated by the pneumatic system to recover said position when a deviation thereof occurs.

4. The application head for applying fiber strips according to claim 1, wherein the tension regulator of each fiber strip comprises a linear displacer incorporating a roller through which the corresponding fiber strip passes, said linear displacer having a position sensor detecting the variations in the position thereof with respect to a mid position for varying the speed of the drive roller depending on the variation detected, in order to maintain the tension of the corresponding fiber strip in an established value.

5. The application head for applying fiber strips according to claim 1, wherein the partial rollers of the compactor system are arranged in a staggered manner in two parallel lines, allowing the application of very narrow fiber strips which are laterally tangent to one another.

6. The application head for applying fiber strips according to claim 1, wherein the partial rollers of the compactor system are made of an elastomer material and have longitudinal holes therein.

* * * * *